(12) United States Patent
Kim

(10) Patent No.: US 10,579,061 B2
(45) Date of Patent: *Mar. 3, 2020

(54) PARKING ASSISTANCE DEVICE FOR VEHICLE AND PARKING CONTROL METHOD THEREOF

(71) Applicant: MANDO CORPORATION, Pyeongtaek-si, Gyeonggi-do (KR)

(72) Inventor: Tak Gen Kim, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 7 days.

This patent is subject to a terminal disclaimer.

(21) Appl. No.: 15/487,842

(22) Filed: Apr. 14, 2017

(65) Prior Publication Data

US 2017/0300057 A1    Oct. 19, 2017

(30) Foreign Application Priority Data

Apr. 15, 2016 (KR) .......................... 10-2016-0046368

(51) Int. Cl.
  *G05D 1/02* (2006.01)
  *G07C 5/08* (2006.01)
  (Continued)

(52) U.S. Cl.
  CPC .......... *G05D 1/0212* (2013.01); *B60W 30/00* (2013.01); *B62D 15/02* (2013.01);
  (Continued)

(58) Field of Classification Search
  CPC .. G05D 1/0212; G05D 1/0231; G05D 1/0255; B62D 15/0285; B62D 15/02; B60W 30/00; G07C 5/08
  See application file for complete search history.

(56) References Cited

U.S. PATENT DOCUMENTS

| 4,931,930 A | 6/1990 | Shyu et al. |
| 2010/0039292 A1* | 2/2010 | Scherl ................. B62D 15/027 340/932.2 |

(Continued)

FOREIGN PATENT DOCUMENTS

| CN | 1846149 A | 10/2006 |
| CN | 102066187 A | 5/2011 |

(Continued)

OTHER PUBLICATIONS

English translation of Office Action issued in Chinese Patent Application No. 201710243175.9 dated Jan. 30, 2019.

*Primary Examiner* — Mussa A Shaawat
(74) *Attorney, Agent, or Firm* — Morgan, Lewis & Bockius LLP

(57) ABSTRACT

Provided are a parking assistance device for a vehicle and a parking control method thereof, capable of preventing collision with a stopper within a parking space by assisting parking in alignment with a parking reference line set with respect to an object located at a distance closest to the self vehicle among distances to objects located around a found parking space. The parking assistance device includes: a parking space searching unit configured to search for a parking space for parking of a self vehicle; a reception unit configured to receive sensing signals sensed from objects located around the parking space; a reference object determination unit configured to use the sensing signals to determine an object closest to the self vehicle as a reference object among the objects located around the parking space; and a parking reference line setting unit configured to set the parking reference line based on a front end of the determined reference object.

10 Claims, 5 Drawing Sheets

(51) Int. Cl.
 *B60W 30/00* (2006.01)
 *B62D 15/02* (2006.01)

(52) U.S. Cl.
 CPC ........... *B62D 15/0285* (2013.01); *G07C 5/08* (2013.01); *G05D 1/0231* (2013.01); *G05D 1/0255* (2013.01)

(56) References Cited

U.S. PATENT DOCUMENTS

| | | | | |
|---|---|---|---|---|
| 2010/0245574 | A1* | 9/2010 | Imanishi | B60R 1/00 348/148 |
| 2012/0072067 | A1* | 3/2012 | Jecker | B62D 15/0285 701/25 |
| 2014/0121883 | A1* | 5/2014 | Shen | B62D 15/0285 701/28 |
| 2015/0078624 | A1* | 3/2015 | Fukuda | B60R 1/00 382/104 |
| 2015/0266509 | A1* | 9/2015 | Ignaczak | B62D 15/027 701/1 |
| 2015/0279210 | A1* | 10/2015 | Zafiroglu | G08G 1/065 340/932.2 |
| 2016/0075369 | A1* | 3/2016 | Lavoie | B62D 15/0285 180/446 |
| 2016/0207528 | A1* | 7/2016 | Stefan | B60W 30/06 |
| 2016/0236680 | A1* | 8/2016 | Lavoie | B60W 30/06 |
| 2016/0280258 | A1* | 9/2016 | Lavoie | B62D 6/10 |
| 2017/0072947 | A1* | 3/2017 | Lavoie | B60W 50/087 |
| 2017/0084179 | A1* | 3/2017 | Chen | B62D 15/025 |
| 2017/0183001 | A1* | 6/2017 | Yamamoto | B60W 30/06 |
| 2017/0212511 | A1* | 7/2017 | Paiva Ferreira | G06Q 10/08 |
| 2017/0267233 | A1* | 9/2017 | Minster | B62D 15/02 |
| 2017/0267288 | A1* | 9/2017 | Maguire | B62D 15/0285 |
| 2018/0334163 | A1* | 11/2018 | Beauvais | B60W 30/06 |

FOREIGN PATENT DOCUMENTS

| | | |
|---|---|---|
| CN | 102310857 A | 1/2012 |
| CN | 104527642 A | 4/2015 |
| EP | 2 597 016 A | 5/2013 |
| KR | 10-2012-0040789 A | 4/2012 |

* cited by examiner

-PRIOR ART-

PARKING ASSISTANCE DEVICE FOR VEHICLE AND PARKING CONTROL METHOD THEREOF

CROSS-REFERENCE(S) TO RELATED APPLICATION

This application claims the benefit of Korean Patent Application No. 10-2016-0046368, filed on Apr. 15, 2016, in the Korean Intellectual Property Office, the disclosure of which is incorporated herein in its entirety by reference.

BACKGROUND OF THE INVENTION

Field of the Invention

The present invention relates to a parking assistance device for a vehicle and a parking control method thereof, and more particularly, to a parking assistance device for a vehicle and a parking control method thereof, capable of preventing collision with an obstacle behind a self vehicle within a parking space by assisting parking in alignment with a parking reference line set with respect to an object located at a distance closest to the self vehicle among distances to objects located around a found parking space.

Description of the Related Art

Recently, an automatic parking control technology for assisting parking has been developed. Such an automatic parking control technology searches around a space for parking of a vehicle, such that the vehicle is parked in the space, calculates a parking route according to the found result, and performs steering control according to the parking route to assist the parking of the vehicle.

When a driver stops a vehicle and activates a parking assistance function, a parking assistance device searches for a parking space through a camera, recognizes an adjacent object around the parking space through an ultrasonic sensor, sets a parking reference line by using the adjacent object, and performs parking control such that the vehicle does not deviate from a preset allowable error with respect to the set parking reference line.

However, an existing parking assistance device sets an X-axis as a length direction of a self vehicle stopped in front of a found parking space and a Y-axis as a width direction of the self vehicle and performs parking control based on a parking reference line set by using an adjacent object when the adjacent object located around the parking space enters in a Y-axis direction at an entrance of the parking space and there is an obstacle such as a stopper behind the self vehicle within the parking space. Thus, a parking end point exceeds a rear end of the parking space, and in particular, rear wheels of the vehicle collide with the stopper during rear perpendicular parking.

More specifically, referring to FIG. 1, when a driver stops a vehicle and selects a rear perpendicular parking mode, an existing parking assistance device searches for a parking space PS through a camera, recognizes adjacent objects (a pillar P and a parked vehicle PC) around the parking space PS through an ultrasonic sensor, and sets a parking reference line L1 by using the object (i.e., the pillar P) closest to the parking space P among the adjacent objects. Thus, if the self vehicle C moves backward until the parking reference line L1 matches a front end of the self vehicle C, rear wheels of the vehicle collide with a stopper ST installed behind the self vehicle C within the parking space PS.

PRIOR ART DOCUMENT

Patent Document (Patent Document 1) Korean Patent Application Publication No. 10-2012-0040789 (published on Apr. 30, 2012), entitled "PARKING ASSISTANCE METHOD AND SYSTEM THEREFOR"

SUMMARY OF THE INVENTION

An aspect of the present invention is directed to provide a parking assistance device for a vehicle and a parking control method thereof, capable of preventing collision with an obstacle behind a self vehicle within a parking space by assisting parking in alignment with a parking reference line set with respect to an object located at a distance closest to the self vehicle among distances to objects located around a found parking space.

According to an embodiment of the present invention, a parking assistance device includes: a parking space searching unit configured to search for a parking space for parking of a self vehicle; a reception unit configured to receive sensing signals sensed from objects located around the parking space; a reference object determination unit configured to use the sensing signals to determine an object closest to the self vehicle as a reference object among the objects located around the parking space; and a parking reference line setting unit configured to set the parking reference line based on a front end of the determined reference object.

According to another embodiment of the present invention, a parking control method of a parking assistance device includes: searching for a parking space for parking of a self vehicle; receiving sensing signals sensed from objects located around the parking space; using the sensing signals to determine an object closest to the self vehicle as a reference object among the objects located around the parking space; and setting the parking reference line based on a front end of the determined reference object.

DETAILED DESCRIPTION OF EMBODIMENTS

Hereinafter, preferred embodiments of the present invention will be described in detail with reference to the accompanying drawings.

Figure 1:
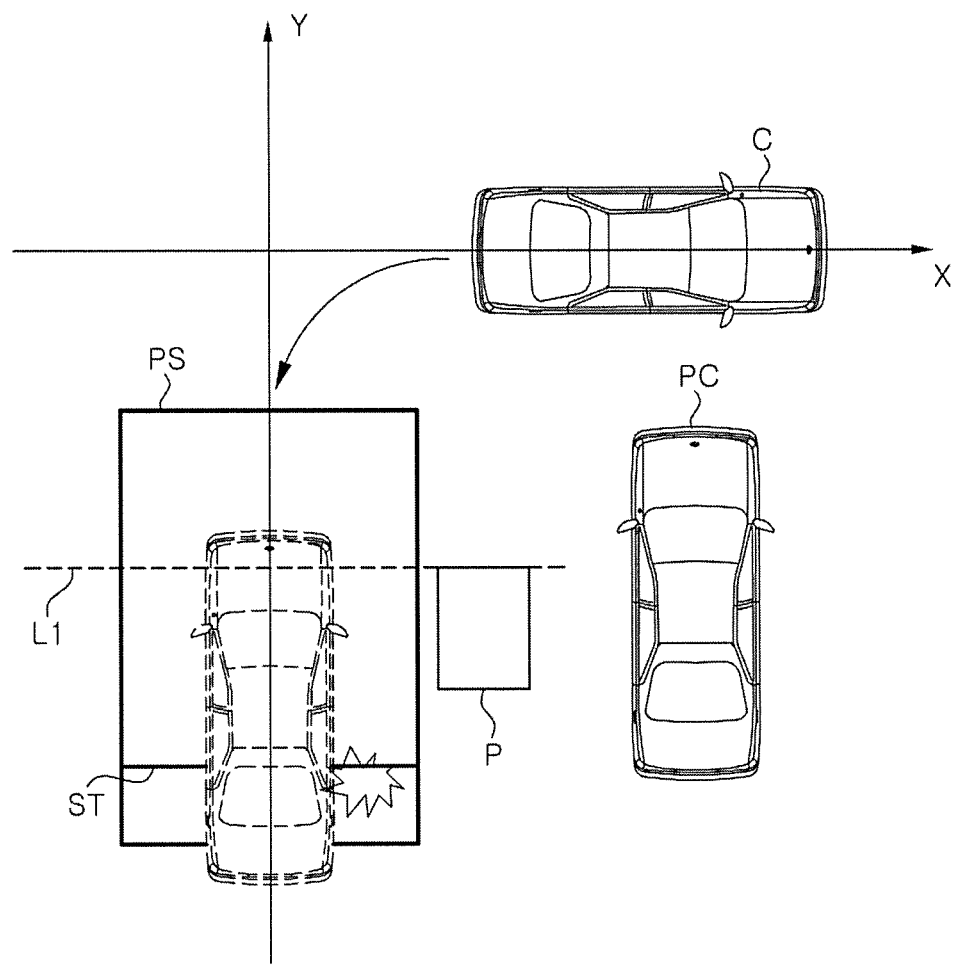
FIG. 1 is a diagram for describing an existing parking assistance device.
Figure 2:
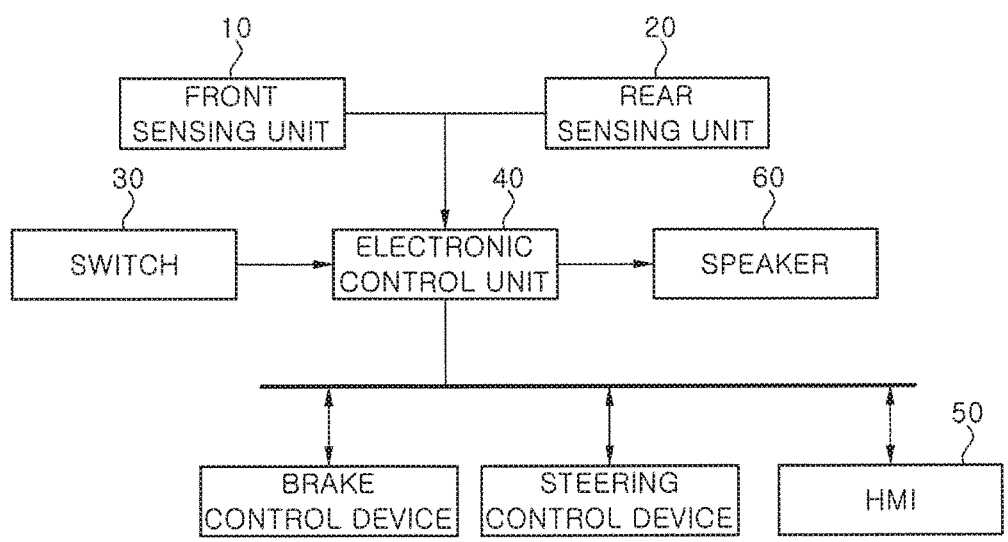
FIG. 2 is a block diagram of a parking assistance device according to an embodiment of the present invention.
Figure 3:
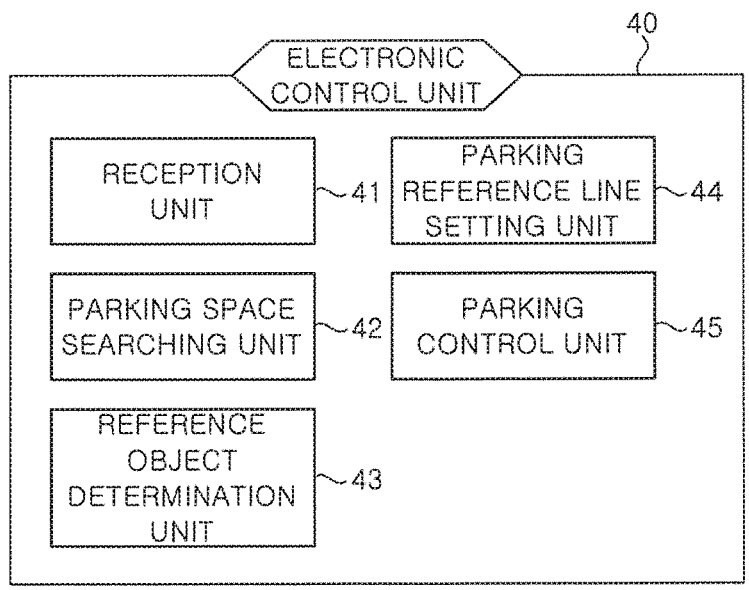
FIG. 3 is a block diagram of an electronic control unit illustrated in FIG. 2.

FIG. 2 is a block diagram of a parking assistance device according to an embodiment of the present invention, and FIG. 3 is a block diagram of an electronic control unit illustrated in FIG. 2.

Referring to FIG. 2, the parking assistance device according to the embodiment of the present invention includes a front sensing unit 10 installed on a front side of a vehicle, a rear sensing unit 20 installed on a rear side of the vehicle, an electronic control unit 40 connected to the front sensing unit 10 and the rear sensing unit 20, a switch 30 configured to allow a user to activate a parking assistance function, and a speaker 60 configured to output an alarm or notification information.

In addition, the parking assistance device according to the embodiment of the present invention may further include a human-machine interface (HMI) 50 configured to display a parking state or vehicle condition information on a display device (not illustrated) under control of the electronic control unit 40.

The parking assistance device according to the embodiment of the present invention is suitably applicable to a smart parking assistance system (SPAS).

The front sensing unit 10 and the rear sensing unit 20 are ultrasonic sensors configured to sense each ultrasonic signal reflected from an object and measure a distance to the object. The sensing signals sensed through the front sensing unit 10 and the rear sensing unit 20 are transmitted to the electronic control unit 40. Although it has been described that the ultrasonic sensors are used as the front sensing unit 10 and the rear sensing unit 20, other sensors such as radar may also be used.

The front sensing unit 10 may be installed at each of a center and corners of the front side of the vehicle and may be provided in plurality. Similarly, the rear sensing unit 20 may be installed at each of a center and corners of the rear side of the vehicle and may be provided in plurality.

When a driver stops a vehicle, activates the parking assistance function through the switch 30, and selects a rear perpendicular parking control mode, the electronic control unit 40 searches for a parking space through a camera (not illustrated), determines an object closest to the self vehicle as a reference object among at least two adjacent objects located around the parking space by using the sensing signals sensed through the front sensing unit 10 and the rear sensing unit 20, when assuming that a length direction of the self vehicle stopped in a lateral direction in front of a found parking space is set as an X-axis and a width direction of the self vehicle is set as a Y-axis, and sets a parking reference line based on a front end of the determined reference object. The adjacent objects located around the parking space indicate objects recognized as a vehicle and a pillar, vehicles parked in parallel to the parking space on left and right sides of the parking space, and pillars located between the parking space and the parked vehicles.

In addition, the electronic control unit 40 displays the found parking space on a screen of a display device (not illustrated) and outputs a gear shift notification notifying a gear shift to "R" on the HMI 50. Then, the electronic control unit 40 performs parking control such that the vehicle is located within the parking reference line, by using the position of the self vehicle and the position of the reference object obtained at the start point when the vehicle enters the parking space.

In addition, when the set parking reference line matches the front end of the self vehicle, the electronic control unit 40 may output notification information notifying parking completion through the speaker 60.

Referring to FIG. 3, the electronic control unit 40 includes a reception unit 41, a parking space searching unit 42, a reference object determination unit 43, a parking reference line setting unit 44, and a parking control unit 45.

The reception unit 41 receives a parking assistance function activation command input by a driver and a parking control mode (here, a rear perpendicular control mode) selected by a driver, and receives image information around the vehicle acquired by a camera (not illustrated) and sensing signals sensed around the parking space by the front sensing unit 10 and the rear sensing unit 20 of the vehicle after the parking assistance function is activated.

The parking space searching unit 42 searches for a parking space securing a preset available parking space by using the image information around the vehicle received by the reception unit 41.

After the parking space is searched for by the parking space searching unit 42, if at least two sensing signals sensed around the parking space are received by the reception unit 41, the reference object determination unit 43 measures Y-axis direction distances between the self vehicle stopped in the X-axis direction in the front of the parking space and adjacent objects located around the parking space by using the respective sensing signals, and determines an object closest in the Y-axis direction as the reference object with respect to the stopped self vehicle among the measured distances. In other words, the reference object determination unit 43 determines, as the reference object, the object closes to the self vehicle stopped in the front of the parking space (that is, the object closest to the stopped self vehicle in the Y-axis direction), not the object closest to the parking space (that is, the object closest to the parking space in the X-axis direction) among the adjacent objects located among the parking space.

Figure 5:
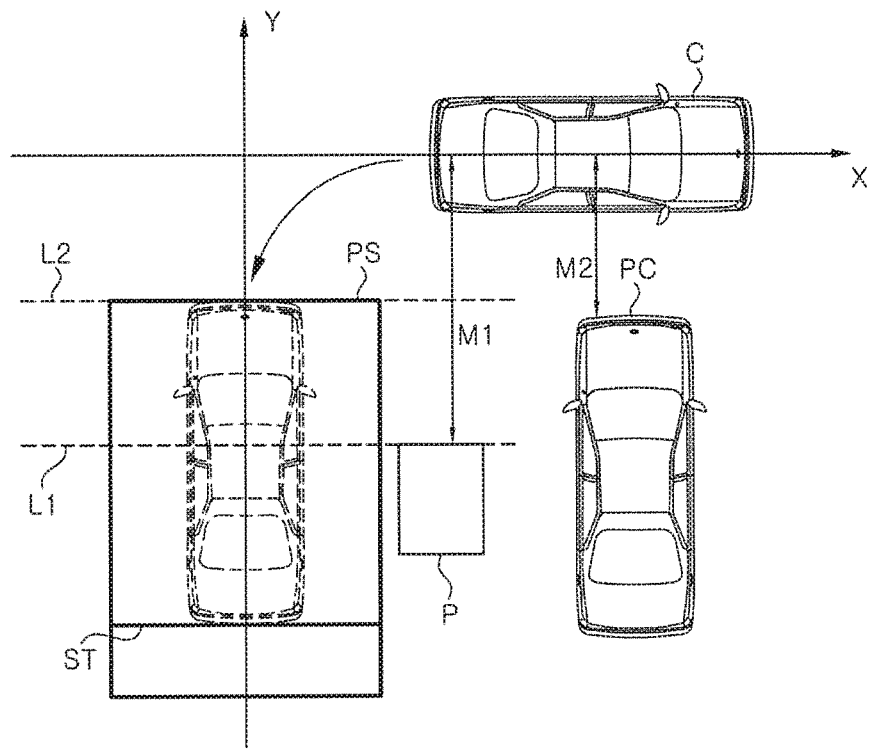
FIG. 5 is a diagram illustrating an environment where two adjacent objects are present on a right side of a parking space.

It is assumed that a pillar P is located on a right side of a parking space PS and a parked vehicle PC is located on a right side of the pillar P as illustrated in FIG. 5, and a parked vehicle PC is located on a left side of a parking space PS and a pillar P is located on the right side of the parking space PS. In such environments, since two sensing signals sensed around the parking space PS are received by the reception unit 41, the reference object determination unit 43 measures the Y-axis direction distances between the self vehicle C stopped in the X-axis direction in the front of the parking space and the adjacent objects P and PC located around the parking space by using the respective sensing signals, and determines the object PC having the closest distance M2 in the Y-axis direction as the reference object with respect to the stopped self vehicle C among the measured distances M1 and M2, not the object closest in the X-axis direction with respect to the parking space PS.

The parking reference line setting unit 44 sets the parking reference line based on the front end of the reference object determined by the reference object determination unit 43 among the adjacent objects located around the parking space.

Figure 6:
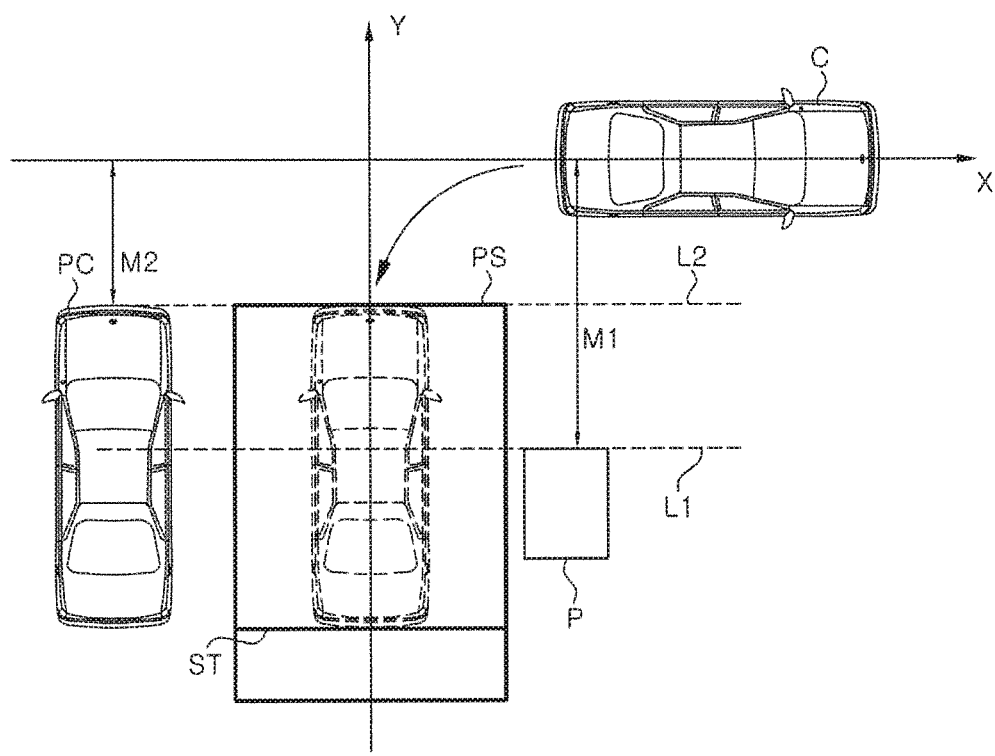
FIG. 6 is a diagram illustrating an environment where adjacent objects are respectively present on left and right sides of a parking space.

In the environments of FIGS. 5 and 6, the parking reference line setting unit 44 sets, as the parking reference line, the line L2 spaced apart from a length-direction central line (X-axis) of the self vehicle stopped in the X-axis direction in the front of the parking space by the Y-axis direction distance M2 between the stopped self vehicle C and the reference object PC.

The parking control unit 45 performs parking control such that the parking reference line set by the parking reference line setting unit 44 matches the front end of the self vehicle.

In this case, the parking control unit 45 determines whether a rear perpendicular parking completion condition is satisfied, based the angle of the vehicle and the position of the vehicle, that is, whether the set parking reference line matches the front end of the self vehicle. When the rear perpendicular parking completion condition is satisfied, the parking control unit 45 may output parking completion information notifying parking completion to the HMI 50. When the rear perpendicular parking completion condition is not satisfied, the parking control unit 45 may control the behavior of the vehicle to satisfy the rear perpendicular parking completion condition.

Since the existing parking assistance device sets the parking reference line based on the adjacent object located closest to the parking space in the width direction of the parking space, there occurs a problem that collides with the object behind the self vehicle within the parking space during the rear perpendicular parking. However, the parking assistance device according to the embodiment of the present invention sets the parking reference line based on the adjacent object closest in the length direction of the parking space with respect to the vehicle stopped in a lateral direction in the front of the parking space among the adjacent objects located around the parking space found during parking space searching. Thus, upon rear perpendicular parking, it is possible to prevent collision with an obstacle located behind the vehicle within the parking space and out of a sensing range of the rear sensing unit 20 of the vehicle, in particular, an obstacle (for example, a stopper) that is lower than a mounting height of the rear sensing unit 20 of the vehicle.

In addition, even though engine torque is applied to the vehicle, if a wheel speed measured by the wheel sensor of the vehicle is 0 or when a collision is sensed by a crash sensor of the vehicle, the parking assistance device according to the embodiment of the present invention may sense a collision with an obstacle behind the vehicle.

A parking control method of the parking assistance device configured as above will be described below with reference to FIG. 4.

Figure 4:
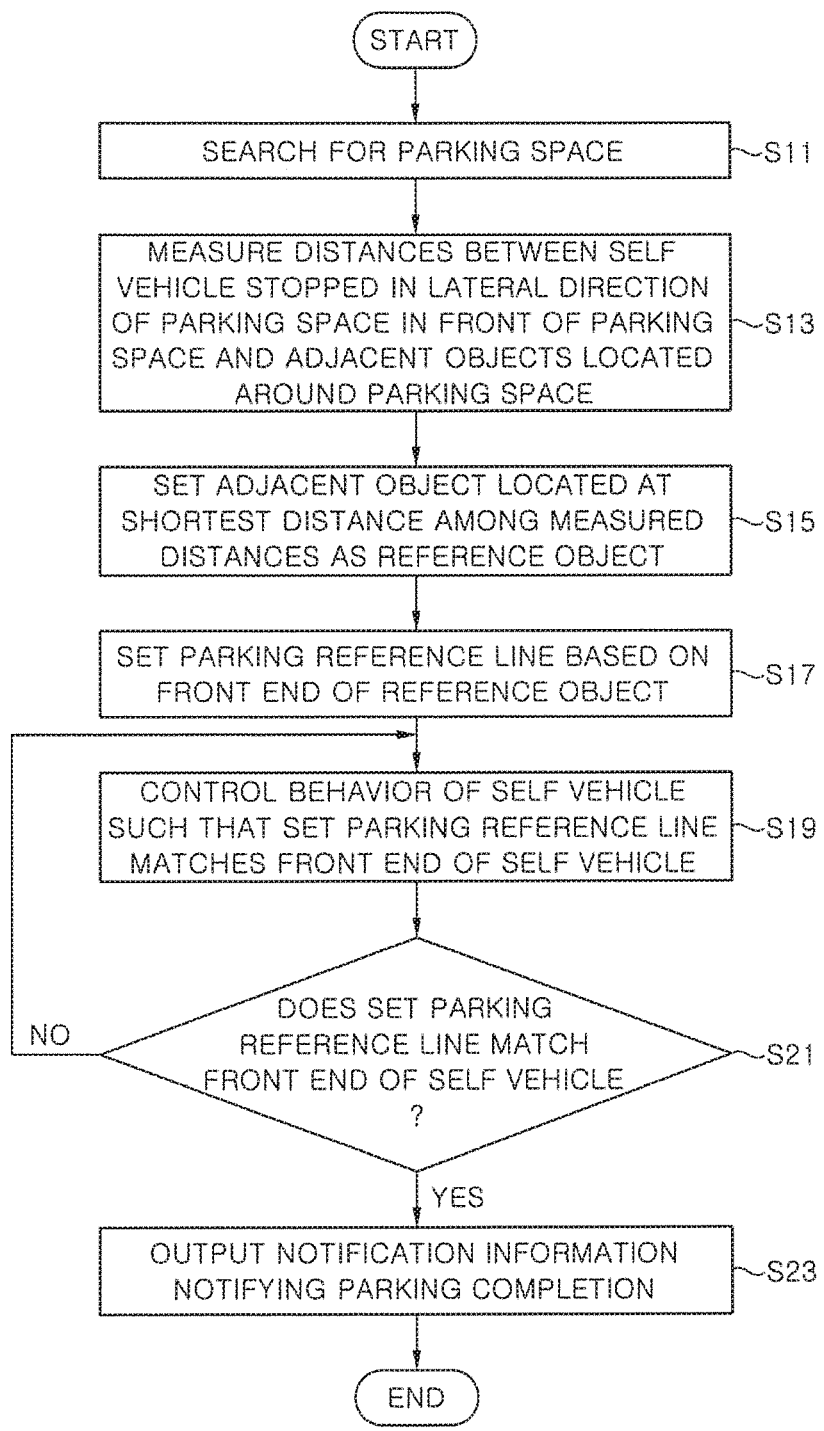
FIG. 4 is a flowchart of a parking control method of a parking assistance device according to another embodiment of the present invention.

FIG. 4 is a flowchart of a parking control method of a parking assistance device according to another embodiment of the present invention.

When the driver stops, activates the parking assistance function through the switch 30, and selects the rear perpendicular parking control mode, the vehicle The electronic control unit 40 searches for a parking space through a camera (not illustrated) (S11).

After the searching for the parking space in operation S11, when at least two sensing signals are sensed around the parking space through the front sensing unit 10 and the rear sensing unit 20, the electronic control unit 40 uses the respective sensing signals to measure distances between the self vehicle stopped in a lateral direction of the parking space in the front of the parking space and adjacent objects located around the parking space (S13).

The electronic control unit 40 determines an adjacent object located at the shortest distance among the measured distances as a reference object (S15).

The electronic control unit 40 sets a parking reference line based on a front end of the reference object determined in operation S15 (S17).

The electronic control unit 40 controls a behavior of the self vehicle such that the parking reference line set in operation S17 matches the front end of the self vehicle (S19).

Then, the electronic control unit 40 determines whether the set parking reference line matches the front end of the self vehicle (S21).

When it is determined in operation S21 that the set parking reference line matches the front end of the self vehicle, the electronic control unit 40 outputs notification information to notify the parking completion (S23). When it is determined in operation S21 that the set parking reference line does not match the front end of the self vehicle, the electronic control unit 40 proceeds to operation S19 to control the behavior of the self vehicle again.

The parking assistance device according to the embodiment of the present invention sets the parking reference line based on the adjacent object closest in the length direction of the parking space with respect to the vehicle stopped in a lateral direction in the front of the parking space among the adjacent objects located around the parking space found during parking space searching. Thus, upon rear perpendicular parking, it is possible to prevent collision with an obstacle located behind the vehicle within the parking space and out of a sensing range of the rear sensing unit of the vehicle, in particular, an obstacle (for example, a stopper) that is lower than a mounting height of the rear sensing unit of the vehicle.

According to the embodiments of the present invention, it is possible to prevent collision with the obstacle behind the self vehicle within the parking space by assisting parking in alignment with the parking reference line set with respect to the object located at a distance closest to the self vehicle among distances to objects located around the found parking space.

While the embodiments of the present invention have been described with reference to the specific embodiments, it will be apparent to those skilled in the art that various changes and modifications may be made without departing from the spirit and scope of the invention as defined in the following claims.

DESCRIPTION OF REFERENCE NUMERALS

| | |
|---|---|
| 10: front sensing unit | 20: rear sensing unit |
| 30: switch | 40: electronic control unit |
| 41: reception unit | 42: parking space searching unit |
| 43: reference object determination unit | 44: parking reference line setting unit |
| 45: parking control unit | 50: HMI |
| 60: speaker | |

What is claimed is:

1. A parking assistance device comprising a controller which is configured to:
   search for a parking space for parking of a self vehicle based on images taken by one or more image sensors;
   receive sensing signals sensed from objects located around the parking space;
   use the sensing signals to determine an object closest to the self vehicle in a direction perpendicular to a traveling direction of the self vehicle as a reference object among the objects located around the parking space;
   set a parking reference line, in a direction parallel to the traveling direction, corresponding to front end of the determined reference object and located between the self vehicle and another object among the objects; and
   control the self vehicle to move to and park in the parking space based on the set parking reference line,
   wherein the object closest to the self vehicle is an object located at a closest distance in a width direction of the self vehicle with respect to the self vehicle stopped in a lateral direction of the parking space in front of the parking space, and wherein the parking reference line is a line spaced apart from a length-direction central line of the stopped self vehicle by the closest distance.

2. The parking assistance device according to claim 1, wherein the lateral direction of the parking space and the length direction of the self vehicle are parallel to each other, and the lateral direction of the parking space and the width direction of the self vehicle are perpendicular to each other.

3. The parking assistance device according to claim 1, wherein the objects located around the parking space are a vehicle parked in parallel to the parking space and a pillar located between the parking space and the parked vehicle.

4. The parking assistance device according to claim 1, wherein the controller controls the self vehicle such that the set parking reference line matches a front end of the self vehicle.

5. The parking assistance device according to claim 4, wherein, even though engine torque is applied to the self vehicle, when a wheel speed measured by a wheel sensor of the self vehicle is 0 or when a collision is sensed by a crash sensor of the self vehicle, the parking assistance device senses a collision with an obstacle behind the self vehicle.

6. A parking control method of a parking assistance device, the parking control method comprising steps of:

searching, by a controller, for a parking space for parking of a self vehicle based on images taken by one or more image sensors;

receiving, by the controller, sensing signals sensed from objects located around the parking space;

using, by the controller, the sensing signals to determine an object closest to the self vehicle in a direction perpendicular to a traveling direction of the self vehicle as a reference object among the objects located around the parking space;

setting, by the controller, a parking reference line, in a direction parallel to the traveling direction, corresponding to a front end of the determined reference object and located between the self vehicle and another object among the objects; and controlling, by the controller, the self vehicle to move to and park in the parking space based on the set parking reference line, wherein the object closest to the self vehicle is an object located at a closest distance in a width direction of the self vehicle with respect to the self vehicle stopped in a lateral direction of the parking space in front of the parking space, and wherein the parking reference line is a line spaced apart from a length-direction central line of the stopped self vehicle by the closest distance.

7. The parking control method according to claim 6, wherein the lateral direction of the parking space and the length direction of the self vehicle are parallel to each other, and the lateral direction of the parking space and the width direction of the self vehicle are perpendicular to each other.

8. The parking control method according to claim 6, wherein the objects located around the parking space are a vehicle parked in parallel to the parking space and a pillar located between the parking space and the parked vehicle.

9. The parking control method according to claim 6, wherein the step of controlling the self vehicle controls the self vehicle such that the set parking reference line matches a front end of the self vehicle.

10. The parking control method according to claim 9, further comprising step of sensing a collision with an obstacle behind the self vehicle when a wheel speed measured by a wheel sensor of the self vehicle is 0 or when a collision is sensed by a crash sensor of the self vehicle, even though engine torque is applied to the self vehicle.

* * * * *